(12) United States Patent
Semper

(10) Patent No.: US 7,324,814 B2
(45) Date of Patent: Jan. 29, 2008

(54) APPARATUS AND METHOD FOR EXCHANGING VERSION INDICATOR INFORMATION BETWEEN ENTITIES IN A WIRELESS NETWORK

(75) Inventor: William J. Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 10/999,605

(22) Filed: Nov. 29, 2004

(65) Prior Publication Data
US 2006/0003759 A1  Jan. 5, 2006

Related U.S. Application Data

(60) Provisional application No. 60/585,478, filed on Jul. 2, 2004.

(51) Int. Cl.
*H04B 1/38* (2006.01)

(52) U.S. Cl. ............ 455/422.1; 455/466; 455/522; 370/331

(58) Field of Classification Search ......... 455/436, 455/439, 466, 522, 422.1; 370/331, 352; 714/786
See application file for complete search history.

(56) References Cited

U.S. PATENT DOCUMENTS

| | | | | |
|---|---|---|---|---|
| 5,946,630 | A | * | 8/1999 | Willars et al. ............ 455/466 |
| 2002/0098859 | A1 | * | 7/2002 | Murata ..................... 455/522 |
| 2003/0126547 | A1 | * | 7/2003 | Hardie et al. ............. 714/786 |
| 2003/0171117 | A1 | * | 9/2003 | Wang et al. .............. 455/436 |
| 2004/0196829 | A1 | * | 10/2004 | Mandayam et al. ....... 370/352 |
| 2004/0214574 | A1 | * | 10/2004 | Eyuboglu et al. ......... 455/439 |
| 2005/0237977 | A1 | * | 10/2005 | Sayeedi .................... 370/331 |

* cited by examiner

*Primary Examiner*—Joseph Feild
*Assistant Examiner*—Michael Vu

(57) ABSTRACT

A communication controller associated with a first network entity in a wireless network. The communication controller communicates with at least a second network entity according to one or more radio access network (RAN) architecture standards and transmits an information request message to the second network entity. The information request message comprises a version indicator field identifying a first RAN architecture standard under which the first network entity operates. The version indicator field comprises a first subfield identifying the first RAN architecture standard and a second subfield identifying a particular version of the first RAN architecture standard.

20 Claims, 3 Drawing Sheets

APPARATUS AND METHOD FOR EXCHANGING VERSION INDICATOR INFORMATION BETWEEN ENTITIES IN A WIRELESS NETWORK

CROSS-REFERENCE TO RELATED APPLICATION AND CLAIM OF PRIORITY

The present invention is related to that disclosed in U.S. Provisional Patent Application Ser. No. 60/585,478, filed Jul. 2, 2004, entitled "Version Indicator for 1xEV-DO IOS Signaling". U.S. Provisional Patent Application Ser. No. 60/585,478 is assigned to the assignee of the present application. The subject matter disclosed in U.S. Provisional Patent Application Ser. No. 60/585,478 is hereby incorporated by reference into the present disclosure as if fully set forth herein. The present invention hereby claims priority under 35 U.S.C. §119(e) to U.S. Provisional Patent Application Ser. No. 60/585,478.

TECHNICAL FIELD OF THE INVENTION

The present invention relates generally to communication networks and, more specifically, to a mechanism for indicating the version of a network standard used by a network entity.

BACKGROUND OF THE INVENTION

Wireless service providers create new markets for wireless devices and expand existing markets by making wireless devices and services cheaper and more reliable. Wireless service providers accomplish this, in part, by improving the capacity and reliability of the wireless network infrastructure, including the base stations at the edge of the network.

Many conventional radio access networks (RANs) adhere to the TIA-878 or TIA-1878 network inter-operability standards. By way of example, the base stations and other infrastructure entities in code division multiple access (CDMA) wireless networks that operate under the 1xEV-DO standard frequently support the TIA-878 standard or the TIA-1878 standard. The TIA-878 and TIA-1878 standards provide signaling message formats that allow network entities (e.g., base stations) to communicate with each other over open interfaces.

For a 1xEV-DO wireless network, when a mobile station (e.g., cell phone, wireless laptop) is handed off from a source base station to a new target base station, the target base station may use information obtained from the mobile station to contact the source base station in order to obtain information about the mobile station. This is done using a Session Information Request message, which is sent from the target base station to the source base station over a backbone Internet Protocol (IP) network that connects the two base stations. Upon receipt of the Session Information Request message, the source base station transmits to the target base station a Session Information Response message that contains the requested information.

However, conventional 1xEV-DO networks do not provide a mechanism for maintaining updated status information regarding the current version of the signaling standards used by network base station and other entities (e.g., mobile switching centers, packet data server nodes, etc.). As a result, if a source base station is operating under a more advanced version of the TIA-878 or TIA-1878 standard than a target base station, the source base station may send a Session Information Response message to the target base station in a format that the target base station does not understand. Conventional 1xEV-DO networks do not allow the target base station to indicate to the source base station the correct format for the Session Information Response message.

Therefore, there is a need in the art for improved wireless communication networks. In particular, there is a need for an improved 1xEV-DO wireless network that enables base stations and other infrastructure components to exchange information regarding the current versions of the TIA-878 standard or the TIA-1878 standard supported by the base stations and other infrastructure components.

SUMMARY OF THE INVENTION

The present invention provides a signaling mechanism by which a first network infrastructure entity (e.g., a base station) indicates to a second network infrastructure entity the particular version of a networking standard under which the first network infrastructure entity operates. The present invention accomplishes this by including a new Version field in the Session Information Request message. The Version field enables the target base station to indicate to the source base station the version of the standard the target base station is running. This source base station uses the data in the Version field to properly format the Session Information Response message.

To address the above-discussed deficiencies of the prior art, it is a primary object of the present invention to provide a communication controller associated with a first network entity for use in a wireless network capable of communicating with a plurality of mobile stations in a coverage area of the wireless network. According to an advantageous embodiment, the communication controller is capable of communicating with at least a second network entity according to at least one of a plurality of radio access network (RAN) architecture standards and wherein the communication controller is capable of transmitting an information request message to the second network entity, the information request message comprising a version indicator field identifying a first RAN architecture standard under which the first network entity operates.

According to one embodiment of the present invention, the communication controller communicates with the second network entity via an Internet protocol (IP) network.

According to another embodiment of the present invention, the version indicator field comprises a first subfield capable of identifying the first RAN architecture standard.

According to still another embodiment of the present invention, the version indicator field comprises a second subfield capable of identifying a particular version of the first RAN architecture standard under which the first network entity operates.

According to yet another embodiment of the present invention, the wireless network is a 1xEV-DO network.

According to a further embodiment of the present invention, the plurality of radio access network (RAN) architecture standards comprise at least a TIA-878 standard and a TIA-1878 standard.

According to a still further embodiment of the present invention, the first subfield comprises a status bit identifying one of the TIA-878 standard and the TIA-1878 standard under which the first network entity operates.

According to a yet further embodiment of the present invention, the first and second network entities are base stations.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
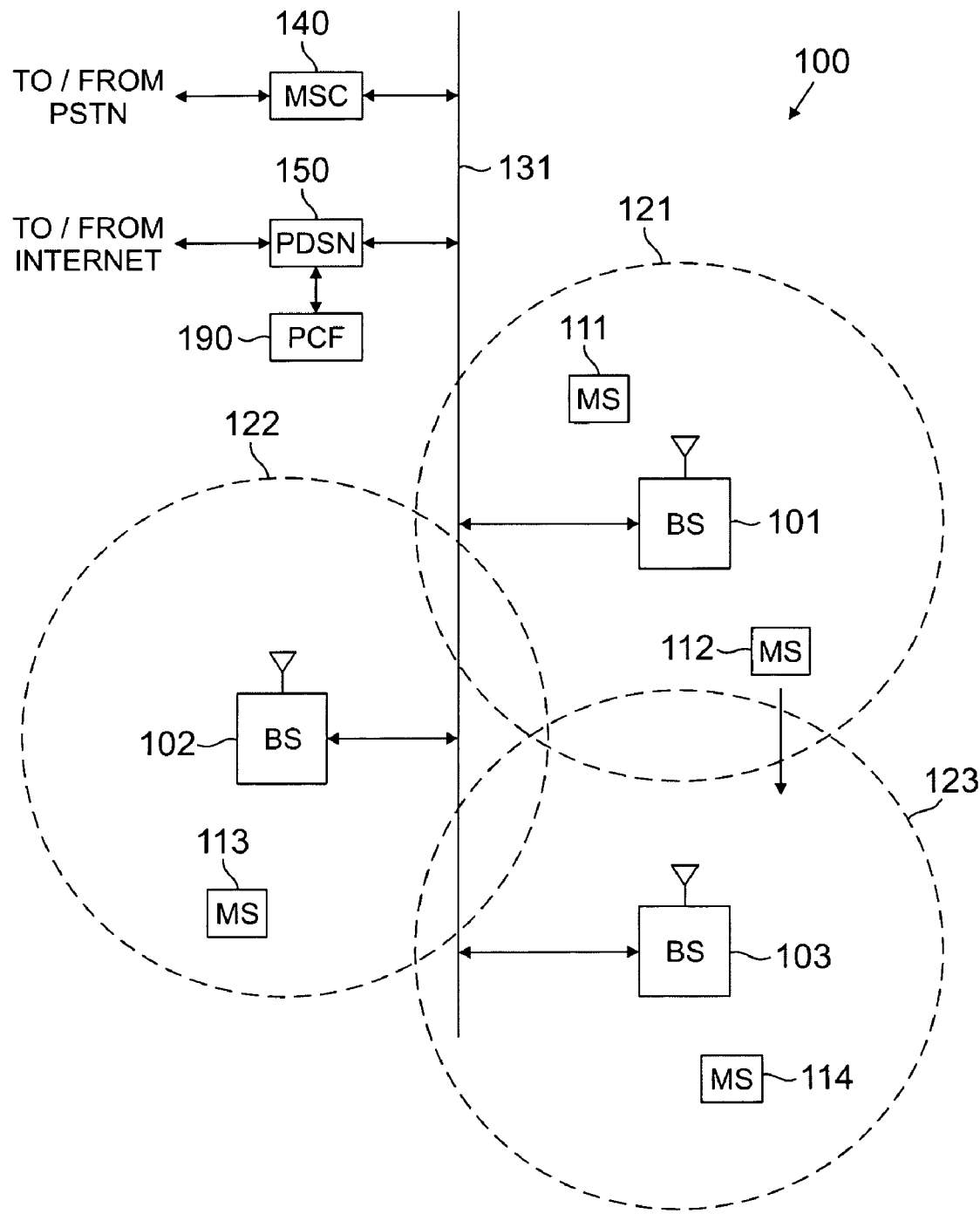
FIG. 1 illustrates an exemplary wireless network that transfers version indicator information between network entities according to the principles of the present invention.

FIG. 1 illustrates exemplary wireless network 100, which transfers version indicator information between network entities according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the 1xEV-DO standard. In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, some or all of the infrastructure entities (i.e., base stations 101-103, MSC 140, PDSN 150, PDF 190, etc.) in wireless network 100 communicate with each other according to the TIA-878 standard or the TIA-1878 standard. Since these standards may be upgraded from time to time on some but not all of the infrastructure entities, it is possible that, for example, a different version of the TIA-878 standard or the TIA-1878 standard may be used on a first base station than on a second base station. The present invention provides a mechanism by which a first network infrastructure entity (e.g., a base station) indicates to a second network infrastructure entity the particular version of a networking standard under which the first network infrastructure entity operates.

Figure 2:
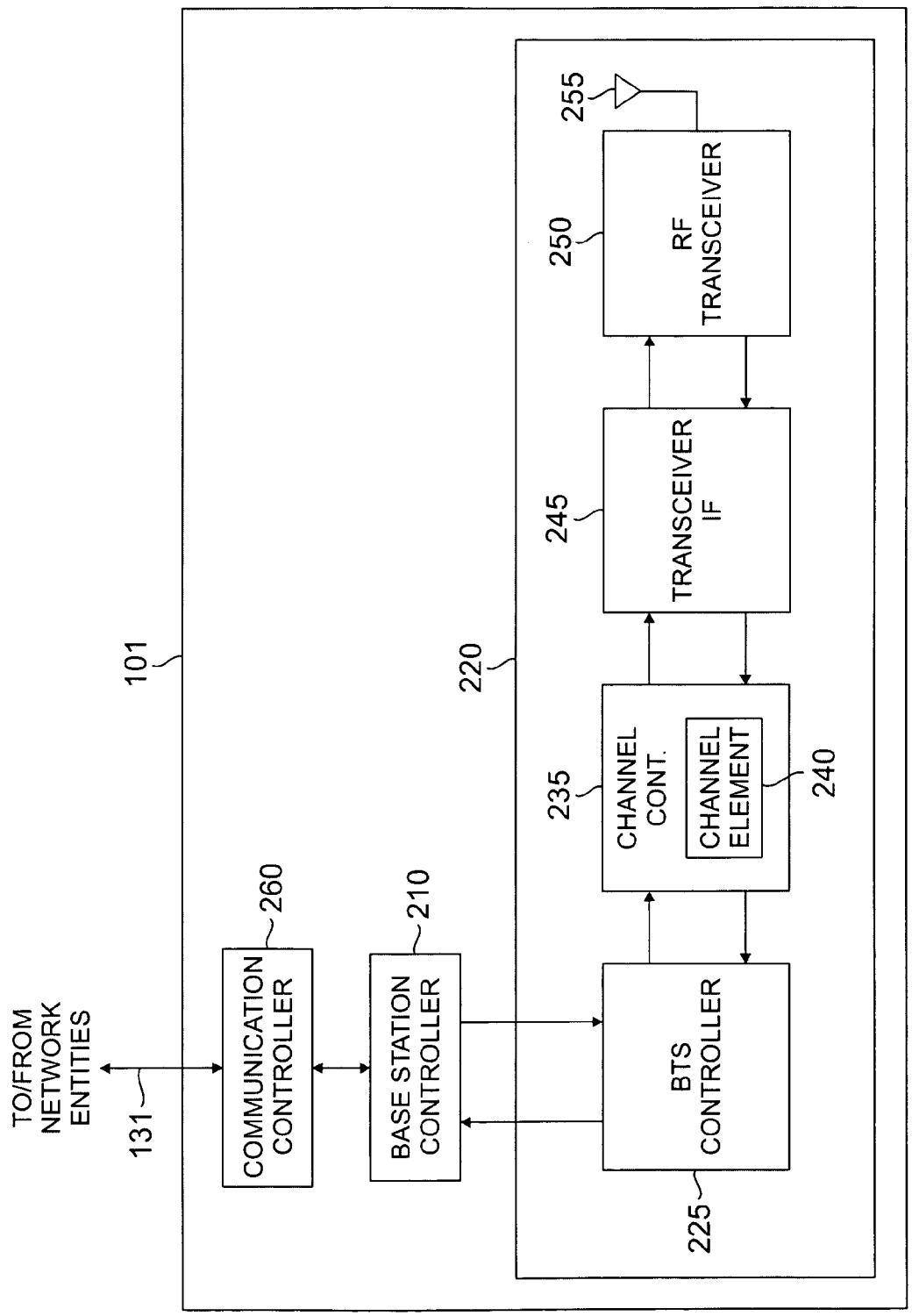
FIG. 2 illustrates in greater detail an exemplary base station that transfers version indicator information according to an exemplary embodiment of the present invention.

FIG. 2 illustrates in greater detail exemplary base station 101, which transfers version indicator information according to an exemplary embodiment of the present invention. Base station 101 comprises base station controller (BSC) 210, base transceiver station (BTS) 220, and communication controller 260. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, transceiver 250 may contain an antenna selection unit to select among different antennas in antenna array 255 during both transmit and receive operations.

Communication controller 260 controls communications with other network entities. Although communication controller 260 is depicted in FIG. 2 as a distinct component separate from BSC 210 and BTS 220, in alternate embodiments of the present invention, communication controller 260 may be implemented as part of BSC 210 or as part of BTS 220, or may be distributed across both BSC 210 and BTS 220. As noted above, communication line 131 is capable of carrying data packets in Internet protocol (IP) format. According to one embodiment of the invention, communication controller 260 is capable of communicating with other network components across an IP network on communication line 131 according to one or both of the TIA-878 standard and the TIA-1878 standard.

According to the principles of the present invention, communication controller 260 uses an improved Session Information Request message to transmit to another network entity a version indicator that indicates the version of the TIA-878 or TIA-1878 standard that is being used by communication controller 260. The present invention introduces a new data field to the Session Information Request message. The new data field indicates which version of the 1xEV-DO networking standard a requesting base station uses. This enables the responding base station to send the requested information in the correct format. The present invention would apply to future revisions of the TIA-878 and TIA-1878 standards, allowing backward compatibility on the network interface.

Figure 3:
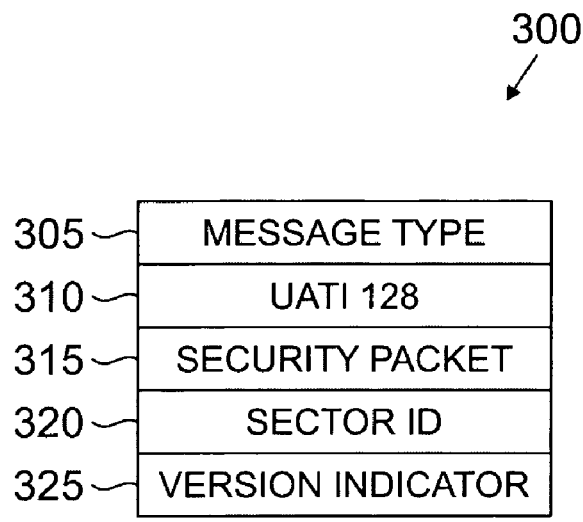
FIG. 3 illustrates an improved Session Information Request message according to an exemplary embodiment of the present invention.

FIG. 3 illustrates improved Session Information Request message 300 according to an exemplary embodiment of the present invention. Session Information Request message 300 comprises four conventional fields, namely Message Type field 305, UATI 128 field 310, Security Packet field 315, and Sector ID field 320, and one new field, namely Version Indicator field 325.

Figure 4:
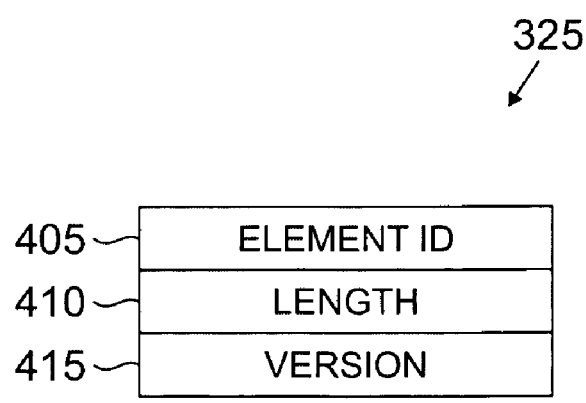
FIG. 4 illustrates in greater detail the Version Indicator field in the improved Session Information Request message in FIG. 3 according to an exemplary embodiment of the present invention.

FIG. 4 illustrates Version Indicator field 325 in Session Information Request message 300 in greater detail according to an exemplary embodiment of the present invention. Version Indicator field 325 comprises Element ID field 405, Length field 410 and Version field 415. In an exemplary embodiment of the present invention, Element ID field 405, Length field 410 and Version field 415 are each one octet (8 bits) in size. Version field 415 may be further subdivided into a first subfield that indicates the architectural standard (e.g., TIA-878, TIA-1878, or another standard) and a second subfield that indicates the version (e.g., Release A, Release B, etc.) of the indicated standard.

According to an exemplary embodiment in which only the TIA-878 or the TIA-1878 standards are supported for 1xEV-DO, the first subfield may be the most significant bit (MSB) of 8-bit Version field 415. By way of example, if the MSB of Version field 415 is set to Logic 0, then the TIA-878 standard is indicated and if the MSB of Version field 415 is set to Logic 1, then the TIA-1878 standard is indicated.

In such an embodiment, the remaining seven bits in Version field 415 indicate which version of the indicated TIA standard the requesting (or target) base station is running. By way of example, [0000000] may indicate Release 0, [0000001] may indicate Release A, [0000010] may indicate Release C, and so forth. Since TIA releases each new version of the standard sequentially, there will be no confusion as to which release the version value corresponds.

Upon receiving improved Session Information Request message 300 from the requesting base station, the responding (or source) base station determines the lesser (i.e., earlier) of its own version numbers and the version number received from the requesting base station. The responding base station uses that lesser value to determine the format for the Session Information Response message. Since the standards are written in a backward compatible manner, even if the responding base station returns a Session Information Response message that is coded to a version that is earlier than the one the requesting base station uses, the requesting base station is still be able to decode the message.

Although the present invention has been described with an exemplary embodiment, various changes and modifications may be suggested to one skilled in the art. It is intended that the present invention encompass such changes and modifications as fall within the scope of the appended claims.

What is claimed is:

1. a base station for use in a wireless network comprising a plurality of base stations, wherein the wireless network is capable of communicating with a plurality of mobile stations in a coverage area of said wireless network, the base station being a first of the plurality of base stations and comprising: a communication controller operable to communicate using a plurality of radio access network (RAN) architecture standards; receive an information request message from a second base station of the plurality of base stations, said information request message comprising a version indicator field identifying a first RAN architecture standard under which said second base station operates, wherein the first RAN architecture standard is one of the plurality of RAN architecture standards; and in response to receiving the information request message, transmitting an information response message to the second base station formatted in accordance with said first RAN architecture standard.

2. The communication controller as set forth in claim 1, wherein said communication controller communicates with said second network entity via an Internet protocol (IP) network.

3. The communication controller as set forth in claim 1, wherein said version indicator field comprises a first subfield capable of identifying said first RAN architecture standard.

4. The communication controller as set forth in claim 3, wherein said version indicator field comprises a second subfield capable of identifying a particular version of said first RAN architecture standard under which said first network entity operates.

5. The communication controller as set forth in claim 4, wherein said wireless network is a 1xEV-DO network.

6. The communication controller as set forth in claim 5, wherein said plurality of radio access network (RAN) architecture standards comprise at least a TIA-878 standard and a TIA-1878 standard.

7. The communication controller as set forth in claim 6, wherein said first subfield comprises a status bit identifying one of said TIA-878 standard and said TIA-1878 standard under which said first network entity operates.

8. The communication controller as set forth in claim 1, wherein said first and second network entities are base stations.

9. A wireless network comprising:
a plurality of base stations, each of said base stations capable of communicating with a plurality of mobile stations in a coverage area of said wireless network; and
a communication controller associated with a first one of said plurality of base stations, wherein said communication controller is capable of:
communicating using a plurality of radio access network (RAN) architecture standards;
receiving an information request message from said second base station, said information request message comprising a version indicator field identifying a first RAN architecture standard under which said second base station operates, wherein the first RAN architecture standard is one of the plurality of RAN architecture standards; and
in response to receiving the information request message, transmitting an information response message to the second base station formatted in accordance with said first RAN architecture standard.

10. The wireless network as set forth in claim 9, further comprising an Internet protocol (IP) network coupling said plurality of base station, wherein said communication controller communicates with said second base station via said IP network.

11. The wireless network as set forth in claim 9, wherein said version indicator field comprises a first subfield capable of identifying said first RAN architecture standard.

12. The wireless network as set forth in claim 11, wherein said version indicator field comprises a second subfield capable of identifying a particular version of said first RAN architecture standard under which said first network entity operates.

13. The wireless network as set forth in claim 12, wherein said wireless network is a 1xEV-DO network.

14. The wireless network as set forth in claim 13, wherein said plurality of radio access network (RAN) architecture standards comprise at least a TIA-878 standard and a TIA-1878 standard.

15. The wireless network as set forth in claim 14, wherein said first subfield comprises a status bit identifying one of said TIA-878 standard and said TIA-1878 standard under which said first network entity operates.

16. The wireless network as set forth in claim 15, wherein said information request message comprises a Session Information Request message.

17. For use in a wireless network capable of communicating with a plurality of mobile stations in a coverage area of said wireless network, a method of controlling communications between a first network entity and a second network entity, the second network entity capable of communication using a plurality of radio access network (RAN) architecture standards, the method comprising the steps of:
transmitting an information request message from the first to the second network entity, the information request message comprising a version indicator field identifying a first RAN architecture standard under which the first network entity operates, wherein the first RAIN architecture standard is one of the plurality of RAN architecture standards;
in the second network entity, determining the first RAN architecture standard from a value in the version indicator field;
formatting an information response message in the second network entity according to first RAN architecture standard; and
transmitting the information response message from the second network entity to the first network entity.

18. The method as set forth in claim 17, wherein the version indicator field comprises a first subfield capable of identifying the first RAN architecture standard.

19. The method as set forth in claim 18, wherein the version indicator field comprises a second subfield capable of identifying a particular version of the first RAN architecture standard under which the first network entity operates.

20. The method as set forth in claim 19, wherein the wireless network is a 1xEV-DO network.

* * * * *

UNITED STATES PATENT AND TRADEMARK OFFICE
CERTIFICATE OF CORRECTION

PATENT NO. : 7,324,814 B2  
APPLICATION NO. : 10/999605  
DATED : January 29, 2008  
INVENTOR(S) : William J. Semper Page 1 of 1

It is certified that error appears in the above-identified patent and that said Letters Patent is hereby corrected as shown below:

Column 7, claim 1, line 16, delete "a" and replace with -- A --; and

Column 8, claim 17, line 45, delete "RAIN" and replace with -- RAN --.

Signed and Sealed this

Seventeenth Day of June, 2008

JON W. DUDAS  
*Director of the United States Patent and Trademark Office*